(12) United States Patent
Yaguchi et al.

(10) Patent No.: US 12,168,234 B2
(45) Date of Patent: Dec. 17, 2024

(54) METHOD OF PRODUCING INORGANIC MATERIAL AND APPARATUS OF PRODUCING INORGANIC MATERIAL

(71) Applicant: FURUKAWA CO., LTD., Tokyo (JP)

(72) Inventors: Yuichi Yaguchi, Tsukuba (JP); Yoshitaka Sakairi, Tsukuba (JP); Haruo Sunakawa, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 488 days.

(21) Appl. No.: 17/617,049

(22) PCT Filed: Jun. 11, 2020

(86) PCT No.: PCT/JP2020/022962
§ 371 (c)(1),
(2) Date: Dec. 7, 2021

(87) PCT Pub. No.: WO2020/250960
PCT Pub. Date: Dec. 17, 2020

(65) Prior Publication Data
US 2022/0331813 A1  Oct. 20, 2022

(30) Foreign Application Priority Data
Jun. 14, 2019  (JP) .................................. 2019-110875

(51) Int. Cl.
*H01M 10/0562* (2010.01)
*B02C 17/18* (2006.01)
*B02C 17/20* (2006.01)

(52) U.S. Cl.
CPC ............ *B02C 17/20* (2013.01); *B02C 17/188* (2013.01); *H01M 10/0562* (2013.01); *H01M 2300/0068* (2013.01)

(58) Field of Classification Search
CPC .............................................. H01M 10/0562
See application file for complete search history.

(56) References Cited

U.S. PATENT DOCUMENTS

| 3,533,566 | A | 10/1970 | Macquat |
| 7,654,396 | B2 | 2/2010 | Takeno et al. |

(Continued)

FOREIGN PATENT DOCUMENTS

| CN | 102324481 A | 1/2012 |
| CN | 109493993 A | 3/2019 |

(Continued)

OTHER PUBLICATIONS

Office Action dated Nov. 7, 2023, issued in counterpart JP Application No. 2022-170548, with English translation. (8 pages).

(Continued)

*Primary Examiner* — Olatunji A Godo
(74) *Attorney, Agent, or Firm* — WHDA, LLP

(57) ABSTRACT

A method of producing an inorganic material (S10) according to the present invention includes a vitrification step (S12) of applying shearing stress and compressive stress to a mixed powder (MP) of a plurality of kinds of inorganic compound powders by using a ring ball mill mechanism (70) to vitrify at least a part of the mixed powder (MP); and a dispersion step (S13) of dispersing the vitrified mixed powder (MP) after the vitrification step (S12), where a combined step of the vitrification step (S12) and the dispersion step (S13) is performed a plurality of times to obtain a vitrified inorganic material powder from the mixed powder.

11 Claims, 10 Drawing Sheets

(56) References Cited

U.S. PATENT DOCUMENTS

| | | | |
|---|---|---|---|
| 8,556,197 | B2 | 10/2013 | Hama et al. |
| 10,461,363 | B2 | 10/2019 | Kanno et al. |
| 2007/0228194 | A1 | 10/2007 | Takeno et al. |
| 2008/0197223 | A1* | 8/2008 | Nagao .................... B02C 17/08 241/175 |
| 2009/0081555 | A1* | 3/2009 | Teramoto ............. H01M 6/185 429/322 |
| 2010/0151335 | A1* | 6/2010 | Senga ................. H01M 10/052 429/322 |
| 2011/0108642 | A1 | 5/2011 | Hama et al. |
| 2017/0084913 | A1* | 3/2017 | Misaki ................. H01M 4/587 |
| 2017/0155168 | A1 | 6/2017 | Kanno et al. |

FOREIGN PATENT DOCUMENTS

| | | |
|---|---|---|
| GB | 401115 A | 11/1933 |
| GB | 468215 A | 6/1937 |
| GB | 2281519 A | 3/1995 |
| JP | S61-25646 A | 2/1986 |
| JP | S61-187246 U | 11/1986 |
| JP | H01-139158 A | 5/1989 |
| JP | 3-157149 A | 7/1991 |
| JP | H05-76793 A | 3/1993 |
| JP | H09-117685 A | 5/1997 |
| JP | 2001-029835 A | 2/2001 |
| JP | 2001239514 A | 9/2001 |
| JP | 2008-4334 A | 1/2008 |
| JP | 2010-40511 A | 2/2010 |
| JP | 2010040190 A | 2/2010 |
| JP | 2015-037009 A | 2/2015 |
| JP | 2016-27545 A | 2/2016 |
| JP | 2018156835 A | 10/2018 |
| JP | 2019-066121 A | 4/2019 |
| KR | 2007-0012474 A | 1/2007 |

OTHER PUBLICATIONS

International Search Report dated Sep. 8, 2020, issued in counterpart International Application No. PCT/JP2020/022962 (2 pages).

Extended (Supplementary) European Search Report dated Jul. 27, 2022, issued in counterpart application No. 20822290.1. (7 pages).

Office Action dated Jul. 28, 2022, issued in counterpart CN application No. 202080041216.6. (8 pages).

Office Action dated Dec. 19, 2022, issued in counterpart KR Application No. 10-2021-7039511, with English Translation. (18 pages).

Extended European Search Report dated May 28, 2024, issued in counterpart EP Application No. 24163637.2. (8 pages).

* cited by examiner

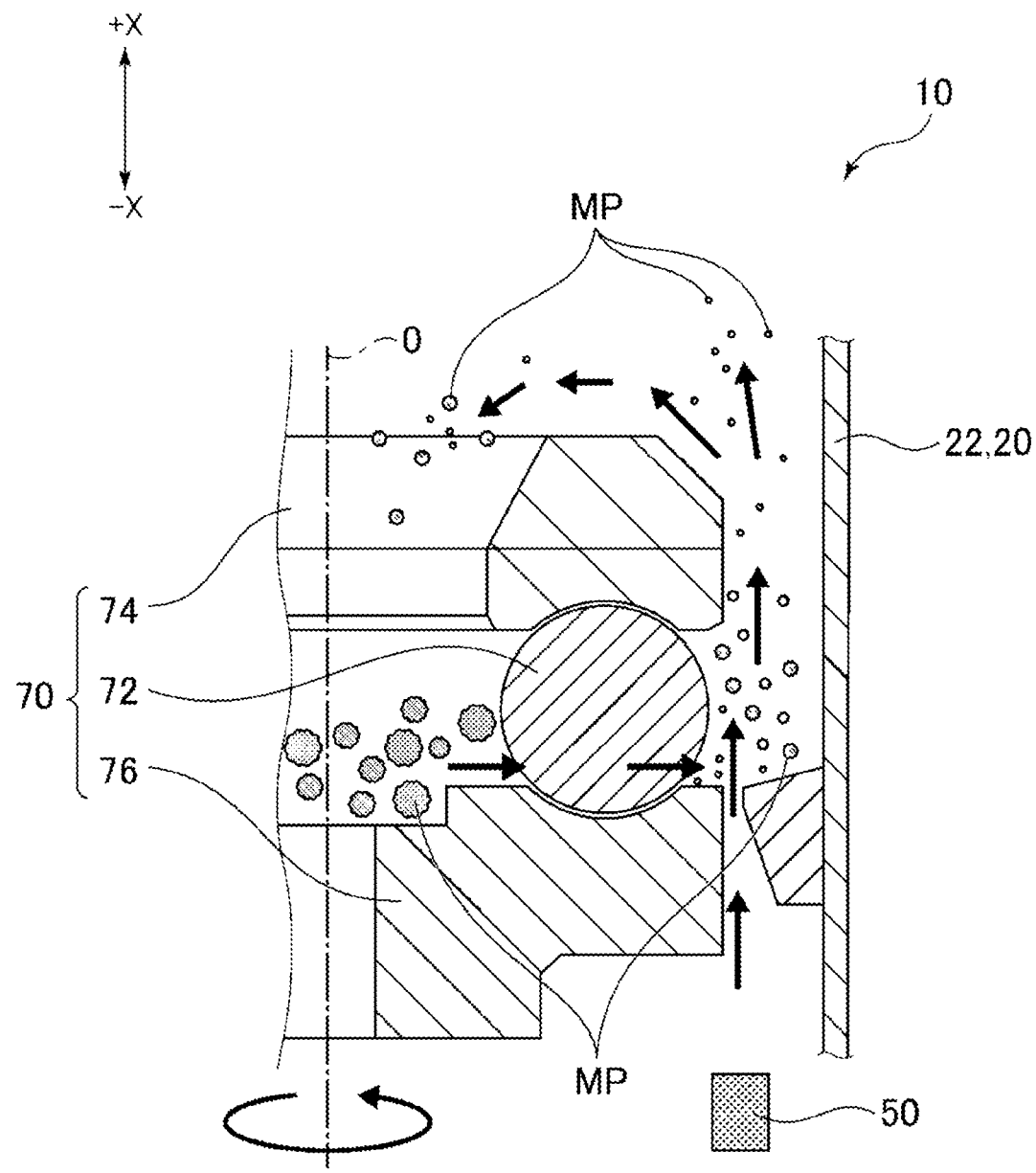

METHOD OF PRODUCING INORGANIC MATERIAL AND APPARATUS OF PRODUCING INORGANIC MATERIAL

TECHNICAL FIELD

The present invention relates to a method of producing an inorganic material and an apparatus of producing an inorganic material.

BACKGROUND ART

It is known that, for example, a lithium ion battery is used as a power source for small portable devices such as mobile phones and laptop computers, and as a power source for electric vehicles and power storage.

A currently commercially available lithium ion battery uses an electrolytic solution containing a flammable organic solvent. On the other hand, a lithium ion battery (an all-solid state lithium ion battery) that has been completely solidified by replacing the electrolytic solution with a solid electrolyte does not use a flammable organic solvent in the battery. As a result, the all-solid state lithium ion battery can simplify the safety device and is excellent in manufacturing cost and productivity. Examples of the solid electrolyte material that is used for such a solid electrolyte include a sulfide-based solid electrolyte material as described in Patent Document 1.

RELATED DOCUMENT

Patent Document

[Patent Document 1] Japanese Unexamined Patent Publication No. 2016-27545

SUMMARY OF THE INVENTION

Technical Problem

Patent Document 1 discloses a method of vitrifying a raw material composition containing a constituent component of a sulfide solid electrolyte material by a mechanical milling method using a planetary ball mill.

However, in a case where the mechanical milling method is carried out using a planetary ball mill, the vitrified inorganic material sticks to the entire inner peripheral surface of the rotating cylinder of the planetary ball mill. As a result, in the mechanical milling method using a planetary ball mill, it is necessary to regularly maintain the planetary ball mill (for example, scraping off the vitrified inorganic material that has been stuck from the inner peripheral surface).

The present invention provides a method of producing an inorganic material, with which a vitrified inorganic material is obtained from a mixed powder of a plurality of kinds of inorganic compounds with high production efficiency.

Solution to Problem

A method of producing an inorganic material according to one aspect of the present invention includes:
a vitrification step of applying shearing stress and compressive stress to a mixed powder of a plurality of kinds of inorganic compound powders by using a ring ball mill mechanism to vitrify at least a part of the mixed powder; and
a dispersion step of dispersing the vitrified mixed powder after the vitrification step,
in which a combined step of the vitrification step and the dispersion step is performed a plurality of times to obtain a vitrified inorganic material powder from the mixed powder.

An apparatus of producing an inorganic material according to one aspect of the present invention includes:
a ring ball mill mechanism that has a plurality of pulverization balls, a lower ring that rotates around an axis while maintaining the plurality of pulverization balls, and an upper ring that is arranged on a side opposite to the lower ring across the plurality of pulverization balls and presses the plurality of pulverization balls against the lower ring;
a container in which the ring ball mill mechanism is arranged in an inside and a hole is formed at a portion on an upper side with respect to the ring ball mill mechanism;
a gas feeding mechanism that is attached to a lower side with respect to the ring ball mill mechanism in the container and feeds gas toward an upper part of the inside;
a cylinder which is attached to the container and penetrates the hole and is configured to flow an outside gas into an axis side with respect to the plurality of pulverization balls in the lower ring; and
a control unit that controls a rotation operation of the lower ring and a gas feeding operation of the gas feeding mechanism,
in which the control unit controls the rotation operation and the gas feeding operation to execute the method of producing an inorganic material according to the one aspect.

Advantageous Effects of Invention

According to the method of producing an inorganic material according to one aspect of the present invention, it is possible to obtain a vitrified inorganic material from a mixed powder of a plurality of kinds of inorganic compounds with high production efficiency.

In addition, according to the apparatus of producing an inorganic material of one aspect of the present invention, it is possible to produce a vitrified inorganic material from a mixed powder of a plurality of kinds of inorganic compounds with high production efficiency.

BRIEF DESCRIPTION OF THE DRAWINGS

FIG. 4C is a view (a cross-sectional view) for describing the relation between the operation of a ring ball mill mechanism and the movement of a powder in the vitrification step and the dispersion step of the present embodiment.

DESCRIPTION OF EMBODIMENTS

Overview

Figure 1:
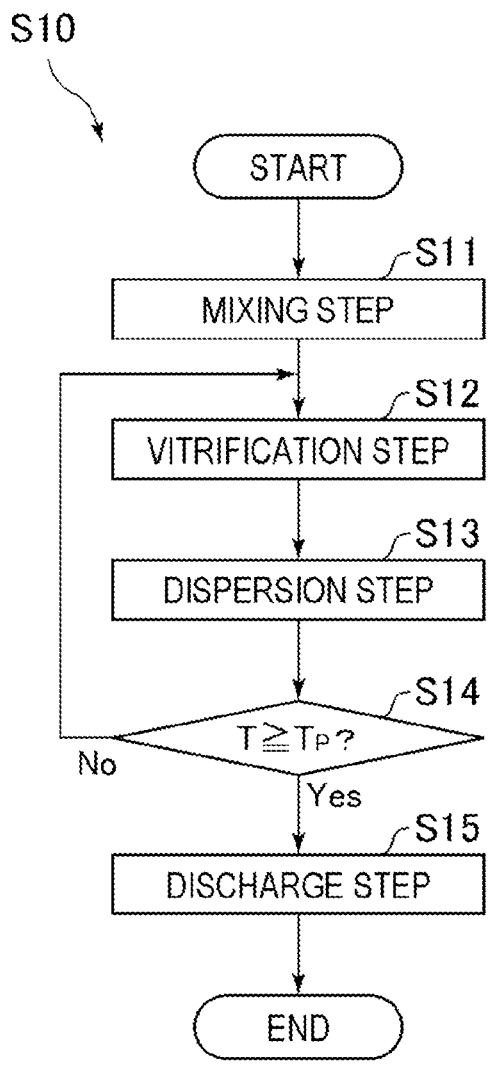
FIG. 1 is a flow chart illustrating a method of producing an inorganic material in the present embodiment (an embodiment as an example of the present invention).

Hereinafter, the present embodiment will be described.

First, the function and the configuration of a mill device 10 (an example of an apparatus of producing an inorganic material, see FIG. 2) that is used for executing a method of producing an inorganic material of the present embodiment will be described. Next, a method of producing an inorganic material S10 of the present embodiment (see FIG. 1) will be described. Next, the effects of the present embodiment will be described.

In all the drawings referred to in the following description, the same reference numeral is assigned to constituent components having the same function, and the description thereof will not be repeated properly in the specification.

Here, the mill device 10 of the present embodiment, the details of which will be described below, includes a ring ball mill mechanism 70 that has a plurality of pulverization balls 72, a lower ring 76 that rotates around an axis (around an axis O) while maintaining the plurality of pulverization balls 72, and an upper ring 74 that is arranged on a side opposite to the lower ring 76 across the plurality of pulverization balls 72 and presses the plurality of pulverization balls 72 against the lower ring 76; a container 20 in which the ring ball mill mechanism 70 is arranged in an inside and a hole 24A is formed at a portion on an upper side with respect to the ring ball mill mechanism 70; a gas feeding mechanism 50 that is attached to a lower side with respect to the ring ball mill mechanism 70 in the container 20 and feeds gas toward an upper part of the inside; a cylinder 30 (hereinafter, referred to as an injection cylinder 30) which is attached to the container 20 and penetrates the hole 24A and is configured to flow an outside gas in an axis side with respect to the plurality of pulverization balls 72 in the lower ring 76; and a control unit 90 that controls a rotation operation of the lower ring 76 and a gas feeding operation of the gas feeding mechanism 50, where the control unit 90 controls the rotation operation and the gas feeding operation to execute the method of producing an inorganic material of the present embodiment (see, FIG. 1, FIG. 2, and the like).

Figure 3A:
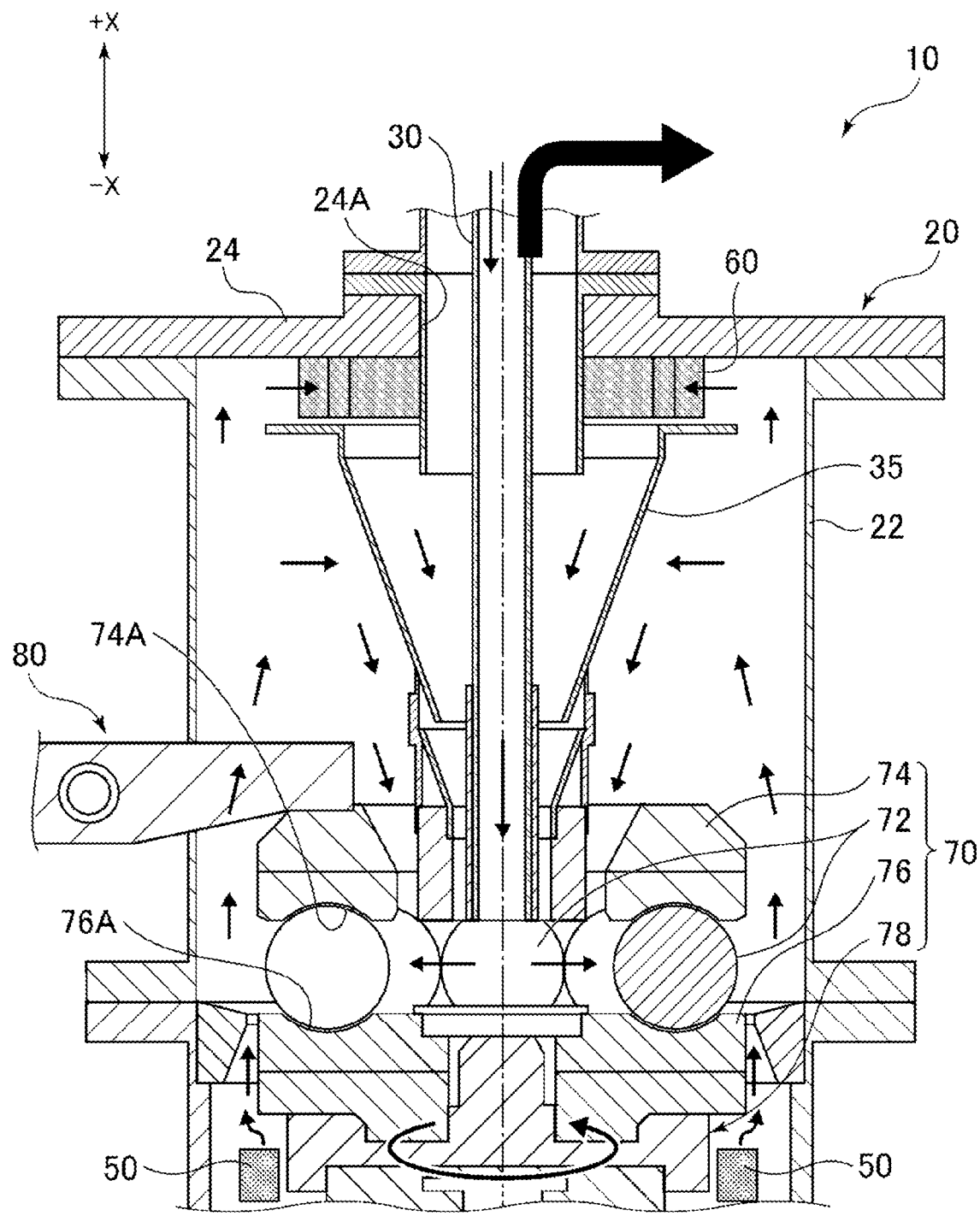
FIG. 3A is a view for describing a vitrification step and a dispersion step at the time of executing the method of producing an inorganic material of the present embodiment.

In addition, the method of producing an inorganic material S10 of the present embodiment includes a vitrification step S12 of applying shearing stress and compressive stress to a mixed powder MP of a plurality of kinds of inorganic compound powders by using a ring ball mill mechanism 70 to vitrify at least a part of the mixed powder MP; and a dispersion step S13 of dispersing the vitrified mixed powder MP after the vitrification step S12, where a combined step of the vitrification step S12 and the dispersion step S13 is carried out a plurality of times to obtain a vitrified inorganic material powder from the mixed powder MP (see, FIG. 1, FIG. 3A, and the like).

Function and Configuration of Mill Device

Hereinafter, the function and the configuration of the mill device 10 of the present embodiment will be described mainly with reference to FIG. 2.

The mill device 10 of the present embodiment has a function of vitrifying the mixed powder MP by applying shearing force and compressive stress to the mixed powder MP (see FIG. 4C) of a plurality of kinds of inorganic compounds described later. As a result, the mill device 10 of the present embodiment has a function of obtaining, that is, producing a powder of a vitrified inorganic material described later from the mixed powder MP of a plurality of kinds of inorganic compounds.

Figure 2:
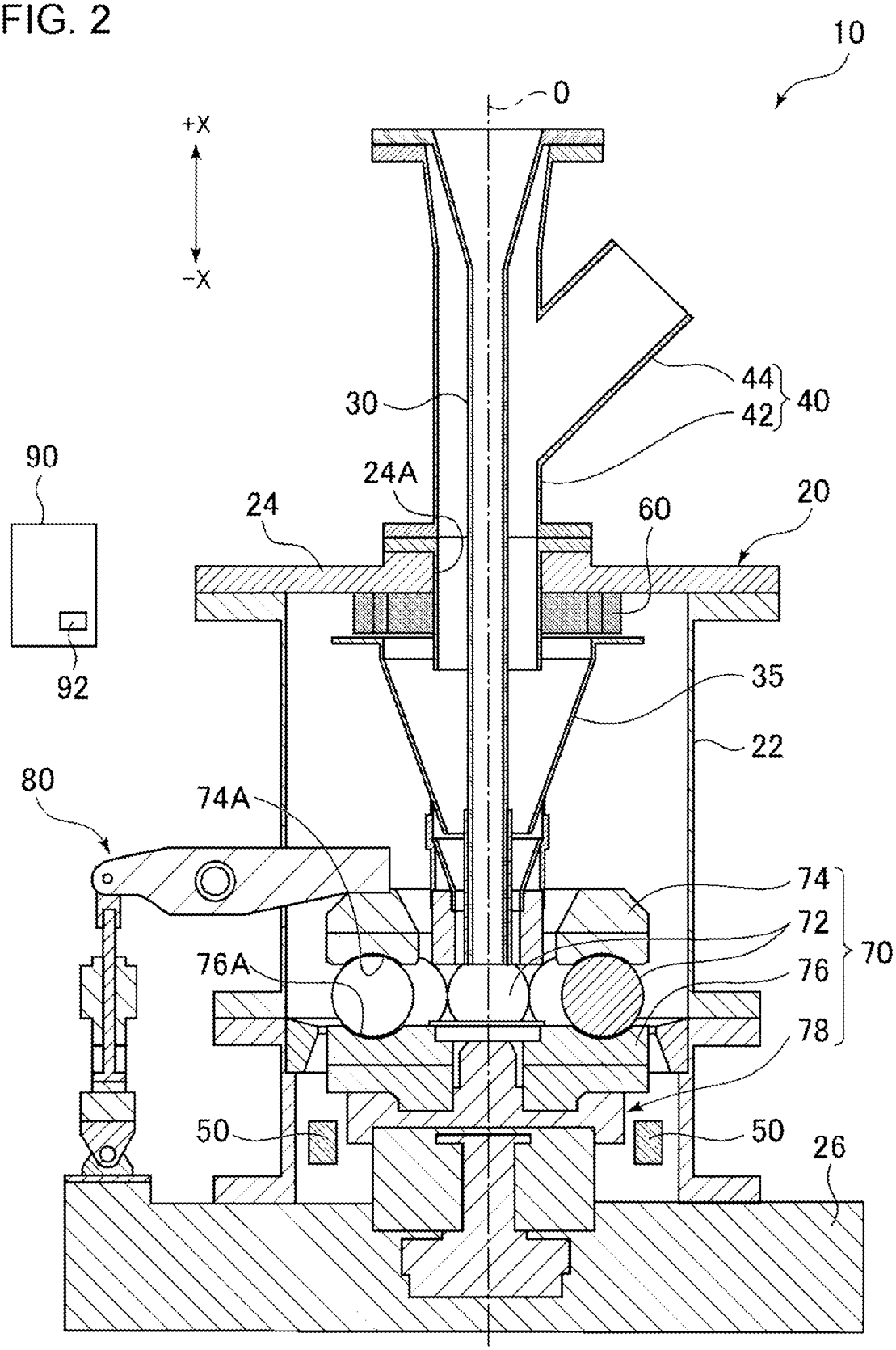
FIG. 2 is a cross-sectional view of a mill device that is used for executing the method of producing an inorganic material of the present embodiment.

As illustrated in FIG. 2, the mill device 10 of the present embodiment includes the container 20, the injection cylinder 30 (an example of the cylinder), the conical cylinder 35, the discharge pipe 40, the gas feeding mechanism 50, and a wing mechanism 60, the ring ball mill mechanism 70, the pressurizing mechanism 80, and the control unit 90.

<Container>

As illustrated in FIG. 2, the container 20 has a cylindrical shape as an example, and has a peripheral wall 22, a top plate 24, and a bottom plate 26. In the inside (the space surrounded by the peripheral wall 22, the top plate 24, and the bottom plate 26) of the container 20, a part of the injection cylinder 30, the conical cylinder 35, a part of the discharge pipe 40, the gas feeding mechanism 50, the wing mechanism 60, a part of the ring ball mill mechanism 70, and a part of the pressurizing mechanism 80 are arranged. A through hole 24A (hereinafter, referred to as a hole 24A) is formed in the top plate 24. From another viewpoint, the hole 24A is formed at a portion on the upper side with respect to the ring ball mill mechanism 70 in the container 20. The reference numeral O in FIG. 2 indicates the axis of the container 20 (the same applies to FIG. 3A to FIG. 5B). Further, the reference numeral +X indicates an upper side in the vertical direction of the mill device 10, and the reference numeral −X indicates a lower side in the vertical direction of the mill device 10 (the same applies to FIG. 3A to FIG. 5B).

<Injection Cylinder, Conical Cylinder, and Discharge Pipe>

The injection cylinder 30 functions as an introduction pipe for introducing the mixed powder MP from the outside to the inside of the container 20 before the start of the operation of producing an inorganic material and as the inflow path through which the gas (as an example, the inert gas such as nitrogen or argon) outside the container 20 flows in the inside during the operation of producing an inorganic material.

As illustrated in FIG. 2, the injection cylinder 30 is arranged in a state of penetrating the hole 24A. The injection cylinder 30 is fixed to the discharge pipe 40 at a portion on the upper end side of the injection cylinder 30 in a state where the outer periphery of the above portion in the vertical direction is surrounded by the discharge pipe 40. Here, the discharge pipe 40 is fitted and fixed in the hole 24A of the top plate 24 of the container 20. That is, the injection cylinder 30 is attached to the container 20 through the discharge pipe 40. In addition, the lower end of the injection cylinder 30 is opened toward a region surrounded by a plurality of pulverization balls 72 of the ring ball mill mechanism 70 described later. Further, the injection cylinder 30 is configured to introduce the mixed powder MP on the central side of the ring ball mill mechanism 70 (on the axis O side with respect to the plurality of pulverization balls 72) before the start of the operation of producing an inorganic material and configured to flow the outside gas during the operation of producing an inorganic material.

The conical cylinder 35 is arranged on an upper side with respect to the ring ball mill mechanism 70 in a state where the apex side thereof (the side having a short outer peripheral length) faces downward in the vertical direction and surrounds a part of the injection cylinder 30.

The discharge pipe 40 is a pipe for discharging the produced inorganic material. As illustrated in FIG. 2, the discharge pipe 40 has an r-shape of the alphabet in a case of being viewed from the front thereof. That is, the discharge pipe 40 has a cylindrical portion 42 arranged along the axis O and a branched portion 44 connected to the central portion of the cylindrical portion 42 in a direction oblique from the vertical direction. The lower end of the cylindrical portion 42 is opened inside the container 20, and the injection cylinder 30 is fixed at the upper end portion of the cylindrical portion 42. The opening at the upper end of the branched portion 44 is connected to a dust collector (not illustrated in the drawing).

<Gas Feeding Mechanism>

As illustrated in FIG. 2, the gas feeding mechanism 50 is attached to the lower side with respect to the ring ball mill mechanism 70 in the container 20 and has a function of feeding a gas (as an example, an inert gas such as nitrogen or argon) toward the upper part of the inside of the container 20.

The gas feeding mechanism 50 has a plurality of gas ejection units as an example. Each gas ejection unit ejects a gas flow toward a gap formed between the inner peripheral surface of the container 20 and the ring ball mill mechanism 70 (the lower ring 76) (see FIG. 3A). Each gas ejection unit is connected to a gas cylinder (not illustrated in the drawing) arranged outside the container 20.

<Wing Mechanism>

Figure 3B:
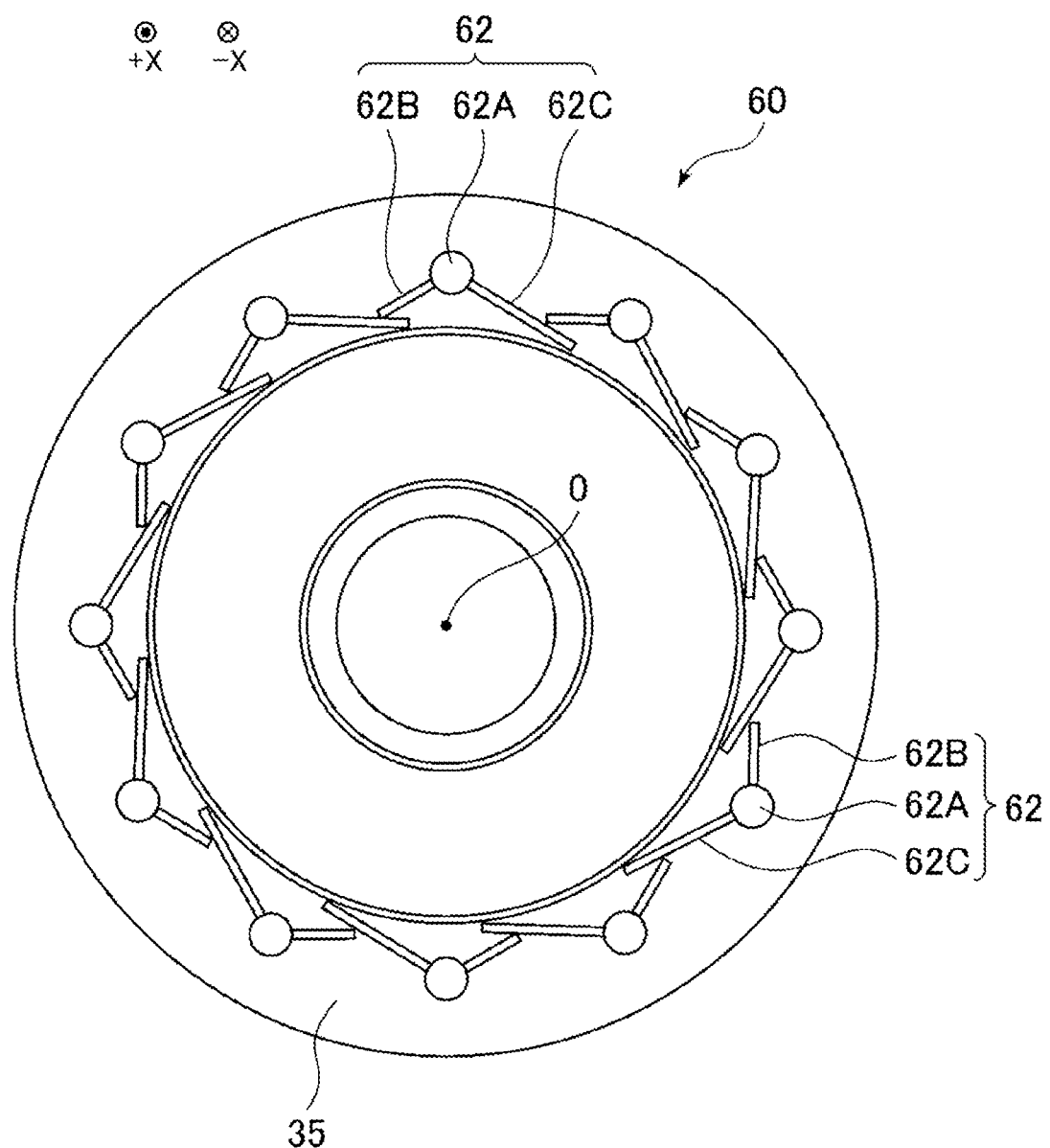
FIG. 3B is a view (a plan view) for describing the posture of a wing mechanism of the mill device in the vitrification step and the dispersion step of the present embodiment.
Figure 5A:
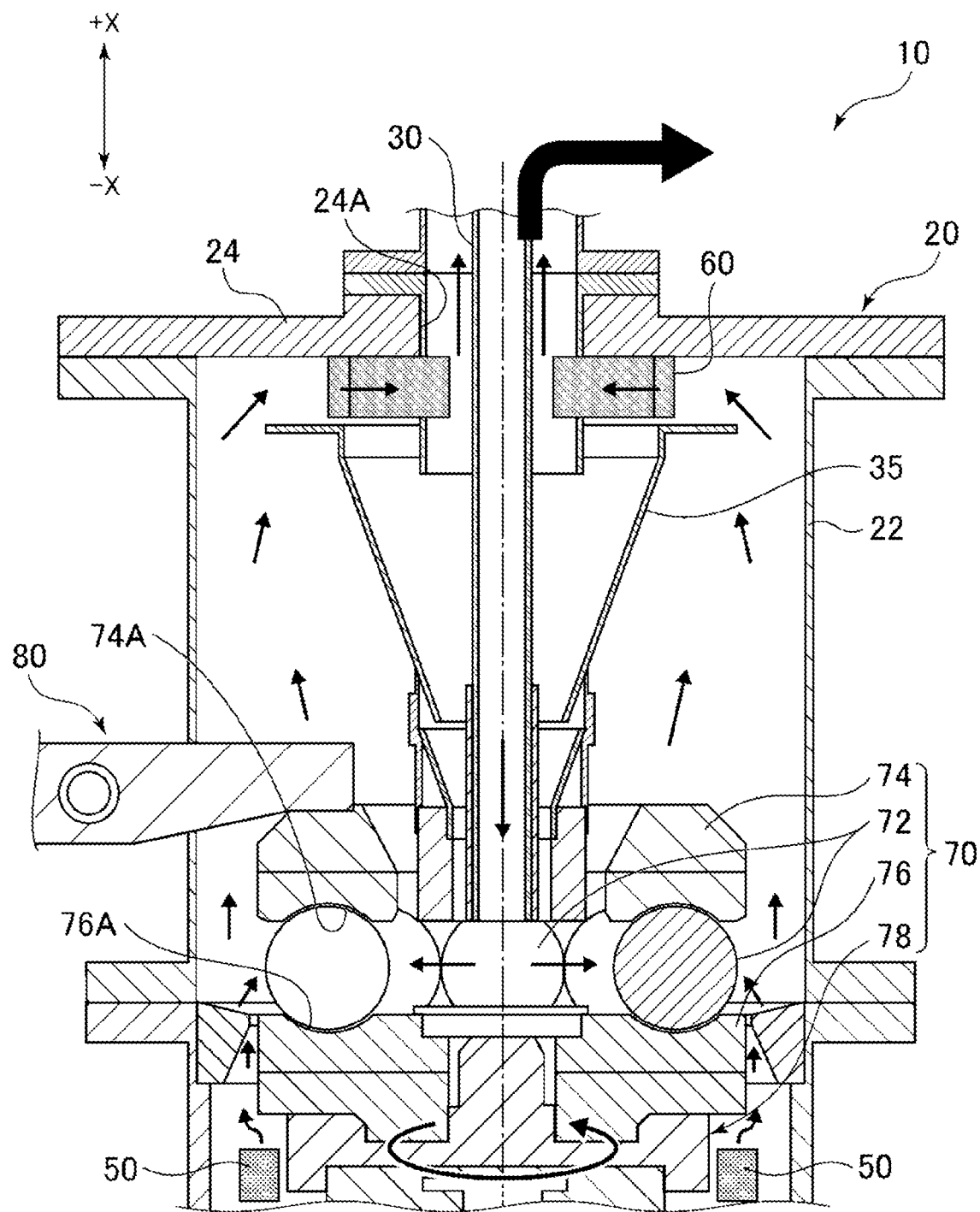
FIG. 5A is a view (a cross-sectional view) for describing a discharge step at the time of executing the method of producing an inorganic material of the present embodiment.
Figure 5B:
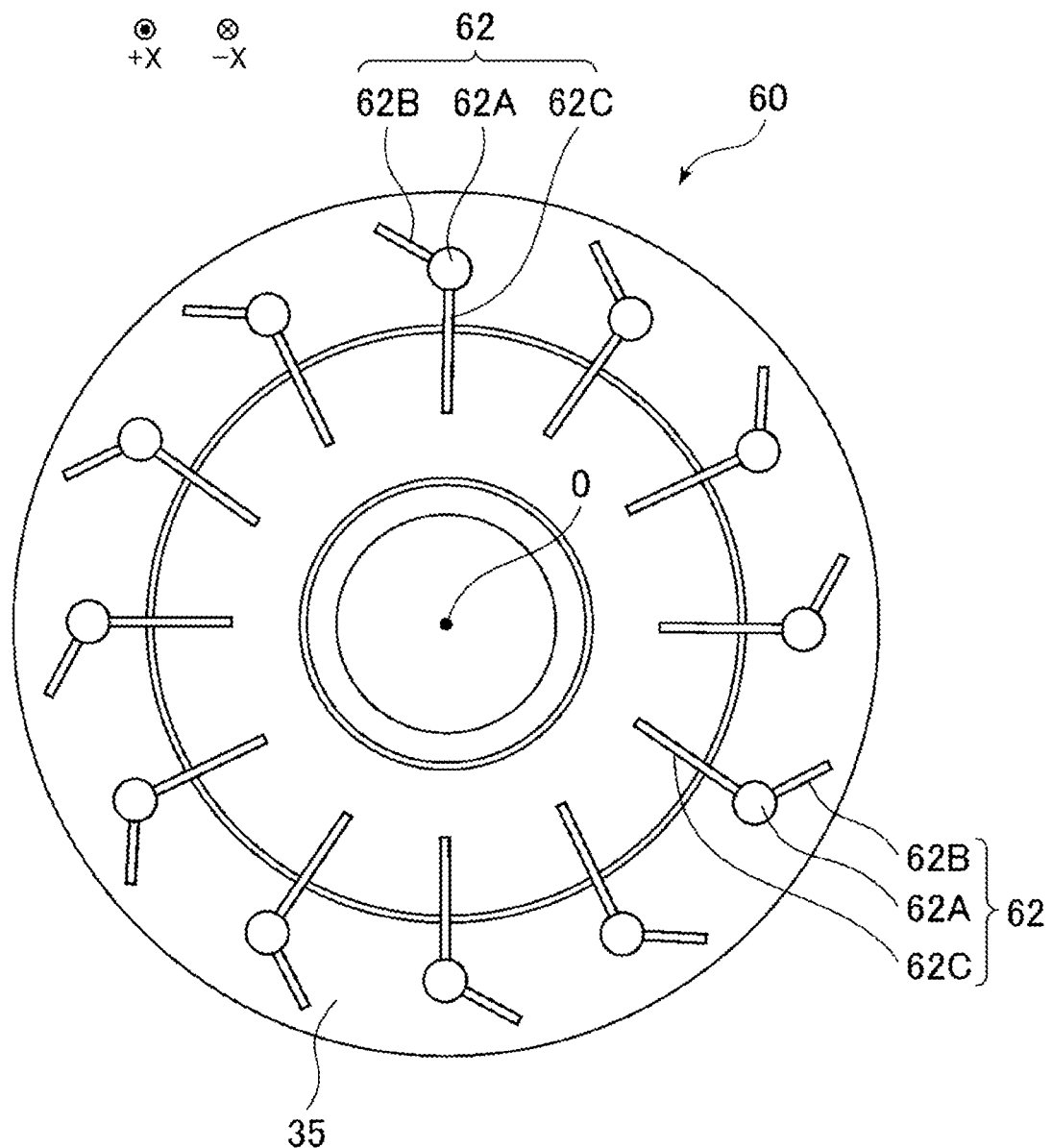
FIG. 5B is a view (a plan view) for describing the posture of a wing mechanism of the mill device in the discharge step of the present embodiment.

As illustrated in FIG. 2, the wing mechanism 60 is arranged between the top plate 24 and the conical cylinder 35 inside the container 20. As illustrated in FIG. 3B and FIG. 5B, the wing mechanism 60 has a plurality of swing wings 62 arranged point-symmetrically with the axis O being a center. Each swing wing 62 is composed of a rotation axis 62A, a short width plate 62B, and a long width plate 62C. The short width plate 62B and the long width plate 62C are attached to the outer peripheral surface of the rotation axis 62A in a state where they are arranged along the axial direction of the rotation axis 62A while facing the direction in which they intersect each other.

Further, in a case where each rotation axis 62A is rotated in the clockwise direction, each swing wing 62 is configured so that a short width plate 62B of a swing wing 62 is brought into contact with a long width plate 62C of an adjacent swing wing 62 to form a wall that covers the entire periphery in the peripheral direction as illustrated in FIG. 3B. On the other hand, in a case where each rotation axis 62A is rotated from the state of FIG. 3B by a predetermined angle in the counterclockwise direction, each swing wing 62 is configured so that a short width plate 62B of a swing wing 62 is spaced apart from a long width plate 62C of an adjacent swing wing 62 to form a gap between the swing wings 62 adjacent to each other as shown in FIG. 5B.

It is noted that FIG. 3B illustrates the posture of the wing mechanism 60 in the vitrification step S12 and the dispersion step S13 (see FIG. 1), which will be described later. In addition, FIG. 5B illustrates the posture of the wing mechanism 60 in the discharge step S15 (see FIG. 1) described later. Further, the wing mechanism 60 of the present embodiment is controlled by the control unit 90 so that the amount of gas that is discharged from the branched portion 44 in the case of the vitrification step S12 and the dispersion step S13 (FIG. 3B) is set to be smaller than the amount of gas that is discharged from the branched portion 44 in the case of the discharge step S15 (FIG. 5B).

<Ring Ball Mill Mechanism and Pressurizing Mechanism>

The ring ball mill mechanism 70 is pressurized by the pressurizing mechanism 80 and has a function of applying shearing force and compressive stress to a mixed powder MP (see FIG. 4C) of a plurality of kinds of inorganic compounds.

As illustrated in FIG. 2, as an example, the ring ball mill mechanism 70 is arranged on the lower side in the vertical direction in the inside of the container 20. The ring ball mill mechanism 70 includes a plurality of pulverization balls 72, the lower ring 76, the upper ring 74, and a drive mechanism 78.

The plurality of pulverization balls 72 are made of ceramic as an example. Here, as the ceramic that constitutes the plurality of pulverization balls 72, alumina, stabilized zirconia, silicon nitride, or the like can be used.

The lower ring 76 is configured to rotate around the axis (around the axis O) by being driven by the drive mechanism 78 while it maintains the plurality of pulverization balls 72. As an example, the lower ring 76 is a donut-shaped member having a through hole formed in the center thereof and is made of ceramic. On the upper surface of the lower ring 76, a plurality of recesses 76A into which each pulverization ball 72 is fitted are formed to maintain the plurality of pulverization balls 72. Here, as the ceramic that constitutes the lower ring 76, alumina, stabilized zirconia, silicon nitride, or the like can be used.

The upper ring 74 is arranged on the side opposite to the lower ring 76 across the plurality of pulverization balls 72 that are maintained in the lower ring 76. The upper surface of the upper ring 74 is configured to be pressurized by a pressurizing mechanism 80 described later so that a plurality of pulverization balls 72 are pressed against the lower ring 76. As an example, the upper ring 74 is a donut-shaped member having a through hole formed in the center thereof and is made of ceramic. On the lower surface of the upper ring 74, a plurality of recesses 74A into which each pulverization ball 72 is fitted are formed in a circular shape point-symmetrically with respect to the axis O in order to maintain the plurality of pulverization balls 72. Here, as the ceramic that constitutes the upper ring 74, alumina, stabilized zirconia, silicon nitride, or the like can be used.

As illustrated in FIG. 2, the drive mechanism 78 is arranged on the lower side of the lower ring 76 in a state of fixing the lower ring 76. The drive mechanism 78 is configured to rotate around the axis (around the axis O) so that the lower ring 76 can rotate at 25 rpm to 300 rpm, as an example, and preferably the lower ring 76 rotates at 100 rpm to 140 rpm.

As described above, the pressurizing mechanism 80 has a function of pressurizing the upper surface of the upper ring 74, as an example, with a pressing force of a ring unit surface area load of 10,000 $kgf/m^2$ to 40,000 $kgf/m^2$, and it preferably pressurizes with a pressing force of a ring unit surface area load of 12,000 $kgf/m^2$ to 28,000 $kgf/m^2$.

<Control Unit>

The control unit 90 has a function of controlling the operation of the mill device 10. Specifically, the control unit 90 controls the rotation operation of the drive mechanism 78, the gas feeding operation of the gas feeding mechanism 50, and the like. Further, the control unit 90 has a timer 92 that counts the rotation time of the drive mechanism 78. The details of the function of the control unit 90 will be described in the description of the method of producing an inorganic material S10 of the present embodiment, which will be described later.

The above is the description of the function and configuration of the mill device 10 of the present embodiment.

Method of Producing Inorganic Material

Next, the method of producing an inorganic material S10 of the present embodiment (hereinafter, referred to as the producing method S10 of the present embodiment) will be described with reference to FIG. 1 and the like.

The producing method S10 of the present embodiment includes a mixing step S11, a vitrification step S12, a dispersion step S13, a determination step S14 of determining whether a predetermined time $T_P$ has elapsed from the start of the vitrification step S12, and a discharge step S15.

In the producing method S10 of the present embodiment, after the mixing step S11, the vitrification step S12, and the dispersion step S13 are carried out in the order described above, the vitrification step S12 and the dispersion step S13 are repeated until the predetermined time $T_P$ elapses, in the determination step S14, from the start of the vitrification step S12, that is, as long as the negative determination continues in the determination step S14. Then, in a case where the predetermined time $T_P$ has elapsed from the start of the vitrification step S12, that is, in a case where a positive determination is made in the determination step S14, the producing method S10 of the present embodiment ends by carrying out the discharge step S15. It is noted that the vitrification step S12, the dispersion step S13, the determination step S14, and the discharge step S15 are executed by the control unit 90 that controls the mill device 10. The predetermined time $T_P$ will be described later.

The details of each step will be described below.

<Mixing Step>

The mixing step S11 is a step of mixing a plurality of kinds of inorganic compound powders to generate the mixed powder MP. The mixing step S11 is carried out using a mixer (not illustrated in the drawing) as an example.

Here, examples of the plurality of kinds of inorganic compounds in the present embodiment are lithium sulfide, lithium nitride, and phosphorus pentasulfide.

Then, in a case where the mixed powder MP is generated in the mixing step S11, the mixed powder MP is introduced into the inside of the container 20 from the injection cylinder 30 of the mill device 10, and this step ends.

<Vitrification Step and Dispersion Step>

Next, the vitrification step S12 and the dispersion step S13 will be described with reference to FIG. 3A, FIG. 3B, and FIG. 4A to FIG. 4C.

First, the control unit 90 controls a plurality of swing wings 62 of the wing mechanism 60 to bring the wing mechanism 60 into the state illustrated in FIG. 3B. Further, the control unit 90 starts driving the drive mechanism 78 of the ring ball mill mechanism 70. In association with this, the lower ring 76 is driven by the drive mechanism 78 to rotate around the axis. In addition, the control unit 90 ejects gas from a plurality of air ejection units of the gas feeding mechanism 50. In this case, a gas (as an example, an inert gas such as nitrogen or argon) continues to flow from the outside into the inside of the container 20 through the injection cylinder 30. In the case of a sulfide, a nitride, a halide, or the like, by which the mixed powder MP or the vitrified inorganic material is easily oxidized, the gas is used by reducing the water concentration and the oxygen concentration thereof. As an example, it is preferable that the water concentration is 1,500 ppm or less and the oxygen concentration is 10% or less, it is more preferable that the water concentration is 400 ppm or less and the oxygen concentration is 1% or less; the threshold value thereof is appropriately determined depending on the properties of the inorganic material. As a result, the gas flow as illustrated in FIG. 3A circulates inside the container 20. Further, the control unit 90 controls the pressurizing mechanism 80 to pressurize the upper ring 74. In association with this, the upper ring 74 presses a plurality of pulverization balls 72 against the lower ring 76.

Then, the vitrification step S12 and the dispersion step S13 are carried out in a state where the air flow as illustrated in FIG. 3A circulates.

The control unit 90 starts the counting of the time by the timer 92 as the drive mechanism 78 starts driving. Then, the control unit 90 ends the vitrification step S12 and the dispersion step S13 in a case where the timer 92 has elapsed for the predetermined time $T_P$.

[Vitrification Step]

The mixed powder MP introduced in the center of the ring ball mill mechanism 70 receives centrifugal force as the lower ring 76 rotates and moves outward in the radial direction of the lower ring 76 (see FIG. 4). As a result, the mixed powder MP moves into a gap between each recess 76A of the lower ring 76 and the pulverization ball 72 maintained in each recess 76A.

Figure 4A:
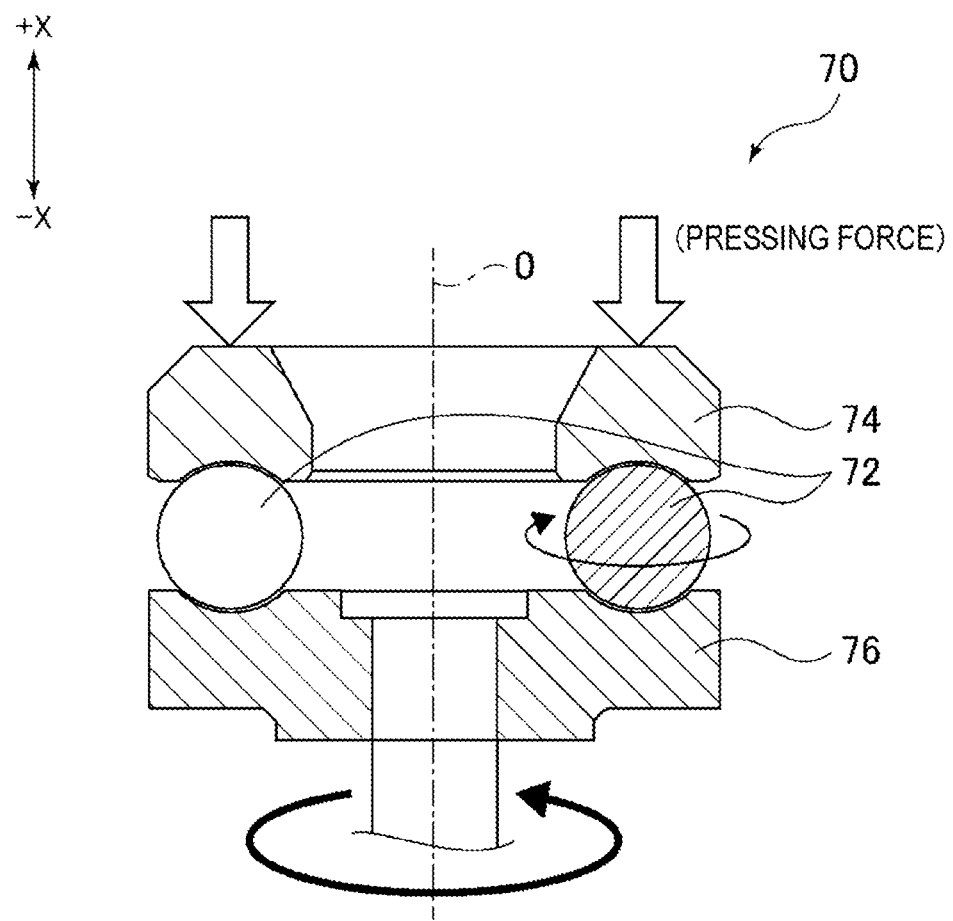
FIG. 4A is a view (a cross-sectional view) for describing the operation of a ring ball mill mechanism of the mill device in the vitrification step and the dispersion step of the present embodiment.
Figure 4B:
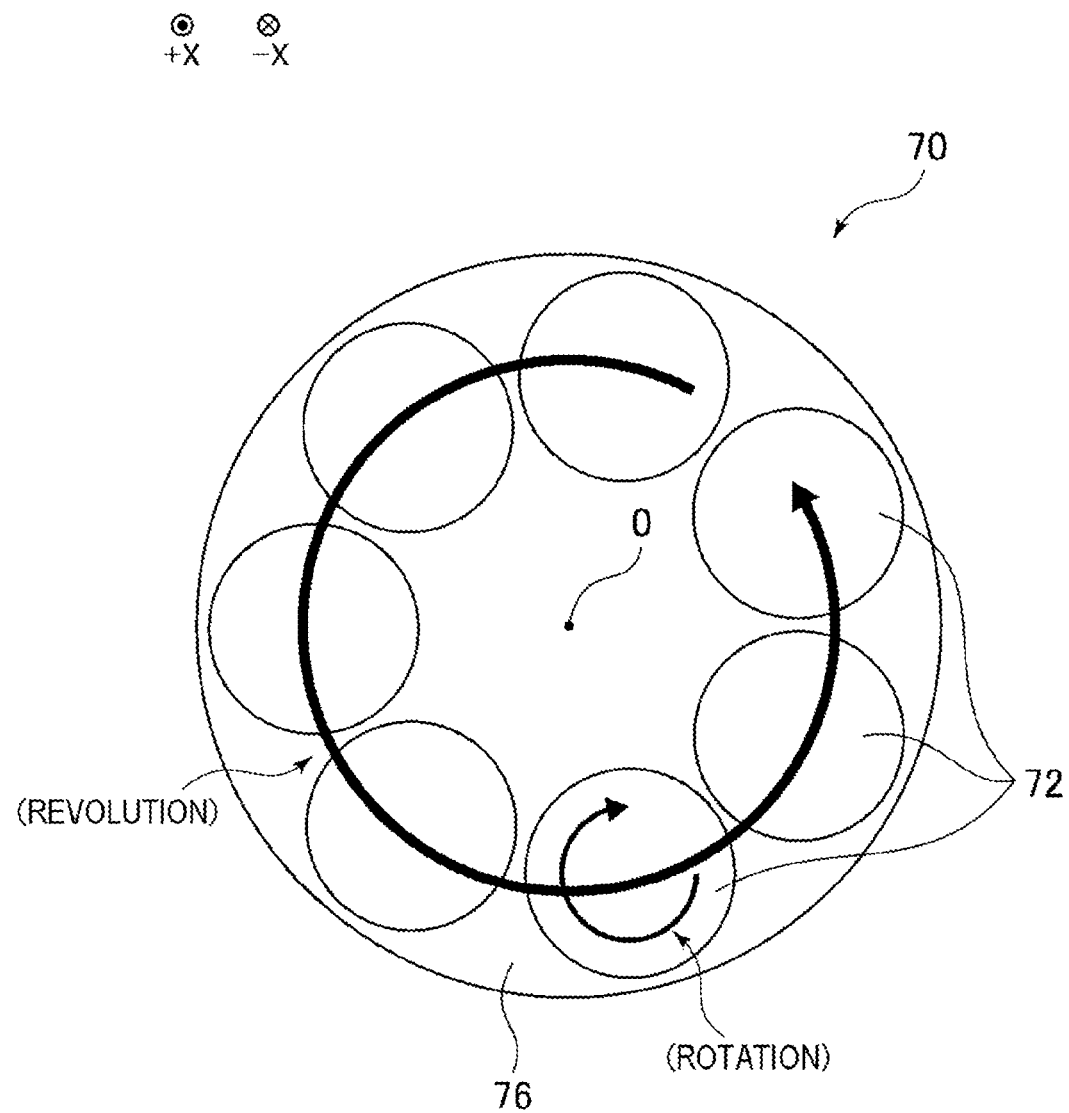
FIG. 4B is a view (a plan view) for describing the operation of a ring ball mill mechanism of the mill device in the vitrification step and the dispersion step of the present embodiment.

On the other hand, as the lower ring 76 rotates, the plurality of pulverization balls 72 revolve around the axis (around the axis O) (see FIG. 4B). In this case, each pulverization ball 72 rotate while revolving due to the facts, for example, that it is fitted into each recess 76A of the lower ring 76 that rotates around the axis and thus is maintained in the lower ring 76 and that it is pressurized by the stationary upper ring 74 (FIG. 4A and FIG. 4B).

As a result, the mixed powder MP that has moved into between the lower ring 76 and the pulverization ball 72 is pressurized by the pulverization ball 72 that moves relative to the lower ring 76 and by the lower ring 76. As a result, the mixed powder MP receives shearing force and compressive stress by the pulverization balls 72 and the lower ring 76. Then, a part of the mixed powder MP moves in between the pulverization ball 72 and the upper ring 74 while being attached to the pulverization ball 72. As a result, a part of the mixed powder MP receives shearing force and compressive stress by the pulverization balls 72 and the upper ring 74. In this manner, while moving outward in the radial direction of the lower ring 76 by a centrifugal force, the mixed powder MP receives shearing force and compressive stress either or both between each pulverization ball 72 and the upper ring 74 and between each pulverization ball 72 and the lower ring 76, and moves to the outer peripheral side of the lower ring 76. Then, in this state, a part of the mixed powder MP is in the state of being vitrified.

The above is the description of the vitrification step S12.

[Dispersion Step]

Next, the mixed powder MP, a part of which is vitrified, floats upward due to the gas ejected from the plurality of gas ejection units of the gas feeding mechanism 50 (see FIG.

4C). In association with this, the mixed powder MP pulverized by the ring ball mill mechanism 70 floats on the upper side with respect to the ring ball mill mechanism 70. In this case, the mixed powder MP is dispersed in the gas. Here, the "dispersion" means that the mixed powder MP, which is an aggregation of aggregated powders, is separated.

Next, the dispersed mixed powder MP is guided by the gas flow that circulates inside the container 20 and moves again to the center of the ring ball mill mechanism 70.

The above is the description of the dispersion step S13.

In this specification, focusing on the movement of the mixed powder MP inside the container 20, the vitrification step S12 and the dispersion step S13 have been described as if they were carried out separately; however, practically, the vitrification step S12 and the dispersion step S13 proceed at the same time. Then, in a case where the predetermined time $T_P$ elapses from the start of the vitrification step S12 and the dispersion step S13, a powder of the vitrified inorganic material is obtained from the mixed powder MP.

Here, the vitrified inorganic material is, for example, an inorganic solid electrolyte material. The inorganic solid electrolyte material is a material that constitutes a solid electrolyte layer of an all-solid state lithium ion battery.

Further, as described above, in the present embodiment, since the plurality of kinds of inorganic compounds are lithium sulfide, lithium nitride, and phosphorus pentasulfide, the inorganic solid electrolyte material which is an example of the vitrified inorganic material is a sulfide-based inorganic solid electrolyte material. That is, the sulfide-based inorganic solid electrolyte material contains at least one of Li, P, and S as a constituent element.

The inorganic solid electrolyte material is not particularly limited, and examples thereof include a sulfide-based inorganic solid electrolyte material, an oxide-based inorganic solid electrolyte material, and a lithium-based inorganic solid electrolyte material. Among these, a sulfide-based inorganic solid electrolyte material is preferable.

The inorganic solid electrolyte material is not particularly limited, and examples thereof include those that are used for the solid electrolyte layer that constitutes the all-solid state lithium ion battery.

Examples of the sulfide-based inorganic solid electrolyte material include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_2S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li_2S_{2+X}$—$P_4S_3$ material, and a $Li_2S$—$P_2S_5$—$P_4S_3$ material.

Among these, a $Li_2S$—$P_2S_5$ material or a $Li_2S$—$P_2S_5$—$Li_3N$ material is preferable since it is excellent in the lithium ion conductivity and has stability that does not cause decomposition in a wide voltage range. Here, for example, the $Li_2S$—$P_2S_5$ material means an inorganic material obtained by chemically reacting an inorganic composition containing at least lithium sulfide ($Li_2S$) and $P_2S_5$ with each other by mechanical treatment. In addition, for example, the $Li_2S$—$P_2S_5$—$Li_3N$ material means an inorganic material obtained by chemically reacting an inorganic composition containing at least lithium sulfide ($Li_2S$), $P_2S_5$, and $Li_3N$ with each other by mechanical treatment.

In the present embodiment, lithium sulfide also includes lithium polysulfide.

Examples of the oxide-based inorganic solid electrolyte material include a NASICON type such as $LiTi_2(PO_4)_3$, $LiZr_2(PO_4)_3$, or $LiGe_2(PO_4)_3$, a perovskite type such as $(La_{0.5+x}Li^{0.5-3x})TiO_3$, a $Li_2O$—$P_2O_5$ material, and a $Li_2O$—$P_2O_5$—$Li_3N$ material.

Examples of the lithium-based inorganic solid electrolyte material include LiPON, $LiNbO_3$, $LiTaO_3$, $Li_3PO_4$, $LiPO_{4-x}N_x$ (x is 0<x≤1), LiN, LiI, LISICON, and the like.

Further, glass ceramics obtained by precipitating crystals of these inorganic solid electrolyte materials can also be used as the inorganic solid electrolyte material.

The sulfide-based inorganic solid electrolyte material in the present embodiment preferably contains Li, P, and S as a constituent element.

<Determination Step>

Next, the determination step S14 will be described. In a case where the time T counted by the timer 92 is equal to or longer than the predetermined time $T_P$, the control unit 90 makes a positive determination and ends the vitrification step S12 and the dispersion step S13.

On the other hand, in a case where the time T counted by the timer 92 is shorter than the predetermined time $T_P$, the control unit 90 makes a negative determination and continues the vitrification step S12 and the dispersion step S13.

Here, the predetermined time $T_P$ is a time set by the test and examination of the inventors of the present application, and specifically, it is set to a time taken until a certain amount (an amount of about 100% such as 98% or more) of the powder of the vitrified inorganic material is obtained from the mixed powder MP before the start of the vitrification step S12 and the dispersion step S13. That is, in a case of focusing on the movement of the mixed powder MP, a combined step of the vitrification step S12 and the dispersion step S13 is carried out a plurality of times in the period corresponding to the predetermined time $T_P$. From another viewpoint, the combined step of the vitrification step S12 and the dispersion step S13 is carried out a plurality of times by feeding gas into the container 20 from the gas feeding mechanism 50 for a predetermined time $T_P$.

It is noted that in the present embodiment, the predetermined time $T_P$ corresponds to a time required for the mixed powder MP to circulate a plurality of times (for example, 5 times or more and 15 times or less) in the vitrification step S12 and the dispersion step S13 as the gas flow circulates inside the container 20. However, the value of the plurality of times referred to here depends on, for example, the magnitude of the pressing force in a case where the pressurizing mechanism 80 pressurizes the upper ring 74, the rotation speed of the lower ring 76 that rotates by being driven by the drive mechanism 78, and the size of the mixed powder MP.

<Discharge Step>

Next, the discharge step S15 will be described with reference to FIG. 5A and FIG. 5B.

The discharge step S15 is a step of discharging the powder of the inorganic material obtained in the vitrification step S12 and the dispersion step S13 from the branched portion 44 of the discharge pipe 40 to a dust collector (not illustrated in the drawing).

In the discharge step S15, the control unit 90 controls a plurality of swing wings 62 of the wing mechanism 60 to bring the wing mechanism 60 into the state illustrated in FIG. 5B. As a result, the gas fed from the gas feeding mechanism 50 into the container 20 flows inside the discharge pipe 40 through the gap formed between the swing wings 62 adjacent to each other, and discharged from the opening at the upper end of the branched portion 44 to the dust collector. In association with this, the inorganic material vitrified inside the container 20 is discharged to the dust collector together with this gas flow.

Then, the vitrified inorganic material inside the container 20 is discharged from the mill device 10, and the producing method S10 of the present embodiment ends.

The above is the description of the producing method S10 of the present embodiment.

<<Effect>>

Next, the effects of the present embodiment will be described with reference to the drawings.

<First Effect>

For example, it is possible to vitrify the mixed powder MP by applying shearing stress and compressive stress to the mixed powder MP using the planetary ball mill disclosed in Patent Document 1. However, according to a test and examination by the inventors of the present application, in a case where the mixed powder MP is vitrified using the planetary ball mill, the vitrified mixed powder MP sticks to the inner peripheral surface of the rotating cylinder of the planetary ball mill. As a result, in the case of the method using a planetary ball mill, it is necessary to regularly maintain the planetary ball mill (for example, scraping off the vitrified inorganic material that has been stuck to the inner peripheral surface from the inner peripheral surface).

On the other hand, in the case of the present embodiment, the ring ball mill mechanism 70 is used (see FIG. 4A to FIG. 4C).

As illustrated in FIG. 2 and FIG. 4A to FIG. 4C, the ring ball mill mechanism 70 has a plurality of pulverization balls 72, a lower ring 76 that rotates around an axis (around an axis O) while maintaining the plurality of pulverization balls 72, and an upper ring 74 that is arranged on a side opposite to the lower ring 76 across the plurality of pulverization balls 72 and presses the plurality of pulverization balls 72 against the lower ring 76.

In the case of the present embodiment, the plurality of pulverization balls 72 that revolve in association with the rotation of the lower ring 76 are rotated, and the shearing stress and the compressive stress are applied to the mixed powder MP that moves from an axis side (the axis O side) to an outer periphery side of the lower ring 76, between the plurality of pulverization balls 72 and the lower ring 76 and between the plurality of pulverization balls 72 and the upper ring 74 by a centrifugal force generated by the rotation of the lower ring 76. In this case, since the upper ring 74 is pressurized by the pressurizing mechanism 80, the plurality of pulverization balls 72 are pressed against the upper ring 74 and the lower ring 76. Further, in this case, the rotation direction of the rotation of each pulverization ball 72 is constantly changed depending on the position of each pulverization ball 72 during the revolution. As described above, in the case of the present embodiment, even in a case where the pulverized mixed powder MP adheres to the upper ring 74 and the lower ring 76, it is immediately scraped off by each pulverization ball 72, unlike the case where the planetary ball mill is used. That is, in the case of the present embodiment, the pulverized mixed powder MP hardly sticks to the recess 74A of the upper ring 74 and the recess 76A of the lower ring 76. As a result, in the case of the present embodiment, maintenance is not required in a case where the above-described planetary ball mill is used, or the time interval of regular maintenance is longer than in a case where the above-described planetary ball mill is used.

As a result, according to the producing method S10 of the present embodiment, it is possible to obtain a vitrified inorganic material from the mixed powder MP of a plurality of kinds of inorganic compounds with high production efficiency as compared with the case of using the planetary ball mill.

<Second Effect>

In the present embodiment, the plurality of pulverization balls 72, the upper ring 74, and the lower ring 76 are each made of ceramic. For this reason, the mixed powder MP hardly adheres to the plurality of pulverization balls 72, the upper ring 74, and the lower ring 76 of the present embodiment as compared with the case where the plurality of pulverization balls 72, the upper ring 74, and the lower ring 76 are made of metal.

As a result, according to the present embodiment, it is possible to obtain a vitrified inorganic material from a mixed powder MP of a plurality of kinds of inorganic compounds with higher production efficiency, as compared with the case where the plurality of pulverization balls 72, the upper ring 74, and the lower ring 76 are made of metal.

Here, the present effect has been described, as a comparison target, using a case where the plurality of pulverization balls 72, the upper ring 74, and the lower ring 76 are made of metal: however, even the case of the comparison target has a configuration in which the above-described first effect is exhibited. That is, even the case of the comparison target belongs to the technical scope of the present invention. In a case where at least one of the plurality of pulverization balls 72, the upper ring 74, and the lower ring 76 is made of ceramic, it can be said that the present effect is easily exhibited as compared with the comparison target. That is, even the case where at least one of the plurality of pulverization balls 72, the upper ring 74, and the lower ring 76 is made of ceramic belongs to the technical scope of the present invention.

<Third Effect>

In the producing method S10 of the present embodiment, as illustrated in FIG. 1, the combined step of the vitrification step S12 and the dispersion step S13 carried out after the vitrification step S12 is carried out a plurality of times to obtain a vitrified inorganic material from the mixed powder MP of a plurality of kinds of inorganic compounds.

Here, as described above, the dispersion step S13 disperses the mixed powder MP at least a part of which is vitrified in the vitrification step S12. Specifically, the mixed powder MP, a part of which is vitrified, floats upward due to the gas ejected from the plurality of gas ejection units of the gas feeding mechanism 50 (see FIG. 4C). In this case, the mixed powder MP is dispersed in the gas. That is, the aggregates of the powders of the mixed powder MP that have been aggregated with each other are separated in the gas. Next, due to the structure of the mill device 10 of the present embodiment, the dispersed mixed powder MP is guided by the gas flow that circulates inside the container 20 and moves again to the center of the ring ball mill mechanism 70. Then, the vitrification step S12 and the dispersion step S13 are repeatedly carried out on the mixed powder MP from the start of the vitrification step S12 until the predetermined time $T_P$ elapses (the S14 in the flow chart of FIG. 1).

As described above, in the producing method S10 of the present embodiment, the mixed powder MP that undergoes the vitrification step S12 is dispersed in the gas in the dispersion step S13 immediately before the vitrification step S12. That is, the mixed powder MP to which shearing stress and compressive stress are applied by the ring ball mill mechanism 70 in the vitrification step S12 is in a state of being loosened by the dispersion step S13 immediately before the vitrification step S12. As a result, according to the producing method S10 of the present embodiment, the mixed powder MP is efficiently vitrified.

For this reason, the producing method S10 of the present embodiment further exhibits the first effect by carrying out a plurality of times the combined step of the vitrification step S12 and the dispersion step S13 after the vitrification step S12.

<Fourth Effect>

As illustrated in FIG. 2, the mill device 10 of the present embodiment includes the ring ball mill mechanism 70, the container 20, the gas feeding mechanism 50, the injection cylinder 30, and the control unit 90. Then, the control unit 90 executes the producing method S10 of the present embodiment by controlling the opening and closing operation of the wing mechanism 60, the rotation operation of the lower ring 76, and the gas feeding operation of the gas feeding mechanism (see FIG. 1 and FIG. 3A to FIG. 5B).

That is, in a case where a vitrified inorganic material is produced from a mixed powder MP of a plurality of kinds of inorganic compounds using the mill device 10 of the present embodiment, the above-described first effect and third effect are exhibited. From another viewpoint, in a case where the mill device 10 of the present embodiment is used, the combined step of the vitrification step S12 and the dispersion step S13 carried out after the vitrification step S12 can be carried out a plurality of times by simple control.

<Fifth Effect>

The mill device 10 of the present embodiment includes the wing mechanism 60 as illustrated in FIG. 2. Then, in the present embodiment, the amount of gas that is discharged from the branched portion 44 can be adjusted by changing the posture of the plurality of swing wings 62 of the wing mechanism 60 (FIG. 3A, FIG. 3B, FIG. 5A, and FIG. 5B). Specifically, in a case where the combined step of the vitrification step S12 and the dispersion step S13 is carried out, the control unit 90 controls the wing mechanism 60 to bring the wing mechanism 60 into the state illustrated in FIG. 3B. On the other hand, in a case where the discharge step S15 is carried out, the control unit 90 controls the wing mechanism 60 to bring the wing mechanism 60 into the state illustrated in FIG. 5B.

By the way, in a case where the vitrification step S12 is carried out while the wing mechanism 60 is in the state of FIG. 5B, most of the mixed powder MP that has floated to the upper side of the inside of the container 20 by the gas feeding mechanism 50 is discharged from the branched portion 44 by the gas flow without returning again to the vitrification step S12. That is, the mill device 10 of the present embodiment can also be used as a normal mill device in which the powder is pulverized once and then immediately discharged.

As a result, according to the mill device 10 of the present embodiment, it is possible to carry out the producing method S10 of the present embodiment and the pulverization with the above-described normal mill device by controlling the posture of the plurality of swing wings 62 of the wing mechanism 60.

The above is the description of the effects of the present embodiment.

As described above, the present invention has been described by taking the above-described embodiment as an example, but the present invention is not limited to the above-described embodiment. The technical scope of the present invention also includes, for example, the following configurations (modifications).

Figure 6:
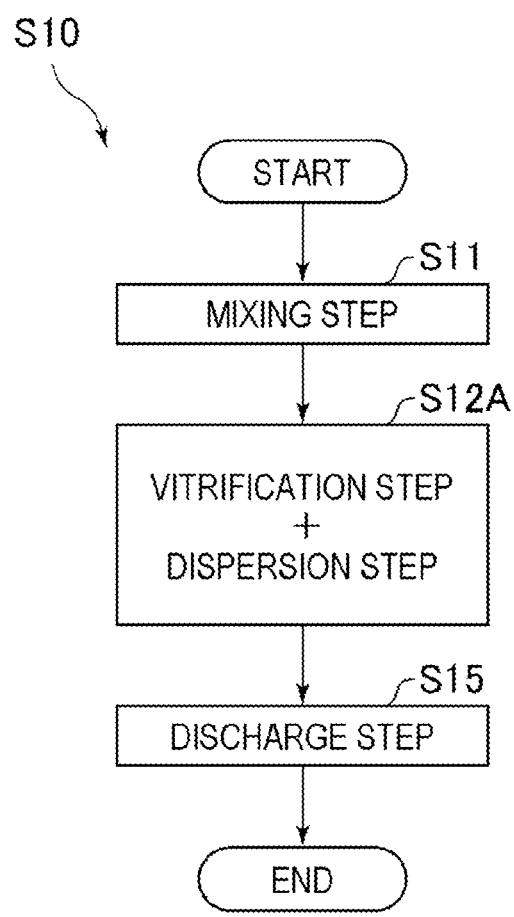
FIG. 6 is a flow chart illustrating the method of producing an inorganic material according to the present embodiment and is a flow chart taken from a viewpoint different from that of the flow chart of FIG. 1.

For example, in the producing method S10 of the present embodiment, it has been described that the dispersion step S13 is carried out after the vitrification step S12 from the viewpoint of movement (the microscopic viewpoint) of the powder that constitutes the mixed powder MP (see FIG. 1). However, from the macroscopic viewpoint, it can be said that the vitrification step S12 and the dispersion step S13 proceed at the same time. As a result, the flow chart of FIG. 1 may be taken as the flow chart of FIG. 6. In this case, the vitrification step S12, the dispersion step S13, and the determination step S14 of the present embodiment can be replaced with a combined step S12A of the vitrification step and the dispersion step carried out for the predetermined time $T_P$.

Further, the producing method S10 (see FIG. 1) of the present embodiment has been described as being carried out using the mill device 10 (see FIG. 2) of the present embodiment. However, in a case where the vitrification step S12 can be carried out using the ring ball mill mechanism 70 and the combined step of the vitrification step S12 and the dispersion step S13 after the vitrification step S12 can be repeated, the producing method S10 of the present embodiment may not be carried out using the mill device 10 of the present embodiment.

Further, in the present embodiment, it has been described that the vitrified inorganic material is, for example, an inorganic solid electrolyte material. However, the vitrified inorganic material may be a positive electrode active material.

Here, Examples of the positive electrode active material include a positive electrode active material that can be used in the positive electrode layer of the lithium ion battery. Specific examples thereof include composite oxides such as a lithium cobalt oxide ($LiCoO_2$), a lithium nickel oxide ($LiNiO_2$), a lithium manganese oxide ($LiMn_2O_4$), a solid solution oxide ($Li_2MnO_3$-$LiMO_2$ (M=Co, Ni, or the like)), a lithium-manganese-nickel oxide ($LiNi_{1/3}Mn_{2/3}Co_{1/3}O_2$) or an olivine-type lithium phosphorus oxide ($LiFePO_4$); and sulfide-based positive electrode active materials such as CuS, a Li—Cu—S compound, $TiS_2$, FeS, $MoS_2$, $V_2S_5$, a Li—Mo—S compound, a Li—Ti—S compound, a Li-V-S compounds, and a Li—Fe—S compound. Among these, a sulfide-based positive electrode active material is preferable, and a Li—Mo—S compound, a Li—Ti—S compound, or a Li-V-S compound is more preferable, from the viewpoints of having a higher discharge capacity density and being more excellent in cycle characteristics.

Further, the vitrified inorganic material may be a mixed powder in which the above-described positive electrode active material, the inorganic solid electrolyte material, and the conductive aid are combined in any ratio. Examples of the conductive aid include a carbon-based fine powder such as carbon black or Ketjen black.

Further, the vitrified inorganic material may be a negative electrode active material.

Here, Examples of the negative electrode active material include a negative electrode active material that can be used in the negative electrode layer of the lithium ion battery. Specific examples thereof include a metal-based material mainly composed of a lithium alloy, a tin alloy, a silicon alloy, a gallium alloy, an indium alloy, an aluminum alloy, or the like, a lithium-titanium composite oxide (for example, $Li_4Ti_5O_{12}$), and a graphite-based material.

Further, the vitrified inorganic material may be a mixed powder in which the above-described negative electrode active material, the inorganic solid electrolyte material, and the conductive aid are combined in any ratio. Examples of the conductive aid include a carbon-based fine powder such as carbon black or Ketjen black.

This application claims priority based on Japanese Patent Application No. 2019-110875 filed in Japan on Jun. 14, 2019, the content of which is incorporated herein in its entirety.

REFERENCE SIGNS LIST

10: mill device (an example of an apparatus of producing an inorganic material)
20: container
22: peripheral wall
24: top plate
24A: through hole (hole)
26: bottom plate
30: injection cylinder
35: conical cylinder
40: discharge pipe
42: cylindrical portion
44: branched portion
50: gas feeding mechanism
60: wing mechanism
62: swing wing
62A: rotation axis
62B: short width plate
62C: long width plate
70: ring ball mill mechanism
72: pulverization ball
74: upper ring
74A: recess
76: lower ring
76A: recess
78: drive mechanism
80: pressurizing mechanism
90: control unit
92: timer
O: axis
S10: method of producing inorganic material
S11: mixing step
S12: vitrification step
S13: dispersion step
S14: determination step
S15: discharge step
$T_P$: predetermined time

The invention claimed is:

1. A method of producing an inorganic material, the method comprising:
a vitrification step of applying shearing stress and compressive stress to a mixed powder of a plurality of kinds of inorganic compound powders by using a ring ball mill mechanism to vitrify at least a part of the mixed powder; and
a dispersion step of dispersing the vitrified mixed powder after the vitrification step,
wherein a combined step of the vitrification step and the dispersion step is performed a plurality of times to obtain a vitrified inorganic material powder from the mixed powder,
wherein the ring ball mill mechanism has a plurality of pulverization balls, a lower ring that rotates around an axis while maintaining the plurality of pulverization balls, and an upper ring that is arranged on a side opposite to the lower ring across the plurality of pulverization balls and presses the plurality of pulverization balls against the lower ring,
in the vitrification step, the plurality of pulverization balls that revolve in association with the rotation of the lower ring are rotated, so that the shearing stress and the compressive stress are applied to the mixed powder that moves from an axis side to an outer periphery side of the lower ring by a centrifugal force generated by the rotation of the lower ring between the plurality of pulverization balls and the lower ring, and between the plurality of pulverization balls and the upper ring.

2. The method of producing an inorganic material according to claim 1,
wherein the plurality of pulverization balls are made of ceramic.

3. The method of producing an inorganic material according to claim 2,
wherein the upper ring and the lower ring are made of ceramic.

4. The method of producing an inorganic material according to claim 1,
wherein the ring ball mill mechanism is arranged in an inside of a container, and
in the dispersion step, gas is fed toward an upper part of the inside from a gas feeding mechanism that is attached on a lower side with respect to the ring ball mill mechanism in the container, to float and disperse the vitrified mixed powder in the gas.

5. The method of producing an inorganic material according to claim 1,
wherein the ring ball mill mechanism is arranged in an inside of a container,
in the dispersion step, gas is fed toward an upper side of the inside from a gas feeding mechanism that is attached on a lower side with respect to the ring ball mill mechanism in the container, to float and disperse the vitrified mixed powder in the gas,
a hole for discharging a part of the inside gas to an outside is formed on an upper side from the ring ball mill mechanism in the container,
a cylinder to flow the outside gas into an axis side with respect to the plurality of pulverization balls in the lower ring is attached to the container, and
in the dispersion step, gas is fed from the gas feeding mechanism into the inside to flow the outside gas from the cylinder while discharging a part of the inside gas from the hole to the outside so that the mixed powder dispersed in the gas reaches the axis side with respect to the plurality of pulverization balls in the lower ring.

6. The method of producing an inorganic material according to claim 5,
wherein the gas is fed from the gas feeding mechanism into the inside in a predetermined period to perform the combined step a plurality of times.

7. The method of producing an inorganic material according to claim 1,
wherein the vitrified inorganic material is an inorganic solid electrolyte material, a positive electrode active material, or a negative electrode active material.

8. The method of producing an inorganic material according to claim 7,
wherein the vitrified inorganic material is the inorganic solid electrolyte material, and
the inorganic solid electrolyte material constitutes a solid electrolyte layer of an all-solid state lithium ion battery.

9. The method of producing an inorganic material according to claim 7,
wherein the vitrified inorganic material is the inorganic solid electrolyte material, and
the inorganic solid electrolyte material contains at least a sulfide-based inorganic solid electrolyte material.

10. The method of producing an inorganic material according to claim 9,
wherein the sulfide-based inorganic solid electrolyte material contains at least one of Li, P, and S as a constituent element.

11. An apparatus of producing an inorganic material comprising:
a ring ball mill mechanism that has a plurality of pulverization balls, a lower ring that rotates around an axis while maintaining the plurality of pulverization balls, and an upper ring that is arranged on a side opposite to the lower ring across the plurality of pulverization balls and presses the plurality of pulverization balls against the lower ring;
a container in which the ring ball mill mechanism is arranged in an inside and a hole is formed at a portion on an upper side with respect to the ring ball mill mechanism;
a gas feeding mechanism that is attached to a lower side with respect to the ring ball mill mechanism in the container and feeds gas toward an upper part of the inside;
a cylinder which is attached to the container and penetrates the hole and is configured to flow an outside gas into an axis side with respect to the plurality of pulverization balls in the lower ring; and
a control unit that controls a rotation operation of the lower ring and a gas feeding operation of the gas feeding mechanism,
wherein the control unit controls the rotation operation and the gas feeding operation to execute a method of producing an inorganic material the method comprising:
a vitrification step of applying shearing stress and compressive stress to a mixed powder of a plurality of kinds of inorganic compound powders by using a ring ball mill mechanism to vitrify at least a part of the mixed powder; and
a dispersion step of dispersing the vitrified mixed powder after the vitrification step,
wherein a combined step of the vitrification step and the dispersion step is performed a plurality of times to obtain a vitrified inorganic material powder from the mixed powder.

* * * * *